(12) United States Patent
Juretzka et al.

(10) Patent No.: US 7,431,010 B2
(45) Date of Patent: Oct. 7, 2008

(54) SELF-IGNITING INTERNAL COMBUSTION ENGINE

(75) Inventors: Andreas Juretzka, West Bloomfield, MI (US); Jochen Schaeflein, Stuttgart (DE)

(73) Assignee: Daimler AG, Stuttgart (DE)

( * ) Notice: Subject to any disclaimer, the term of this patent is extended or adjusted under 35 U.S.C. 154(b) by 178 days.

(21) Appl. No.: 10/529,579

(22) PCT Filed: Sep. 25, 2003

(86) PCT No.: PCT/EP03/10660

§ 371 (c)(1),
(2), (4) Date: Jan. 3, 2006

(87) PCT Pub. No.: WO2004/031559

PCT Pub. Date: Apr. 15, 2004

(65) Prior Publication Data

US 2006/0130805 A1    Jun. 22, 2006

(30) Foreign Application Priority Data

Oct. 1, 2002    (DE) ............................. 102 45 790

(51) Int. Cl.
    *F02B 3/12*    (2006.01)
(52) U.S. Cl. .................................................. 123/299
(58) Field of Classification Search ................. 123/299
 See application file for complete search history.

(56) References Cited

U.S. PATENT DOCUMENTS

| 5,117,790 A * | 6/1992 | Clarke et al. ............... 123/321 |
| 2002/0117126 A1* | 8/2002 | Kaneko ........................ 123/21 |

FOREIGN PATENT DOCUMENTS

| EP | 0 397 521 A1 | 11/1990 |
| JP | 8-28311 A | 1/1996 |

OTHER PUBLICATIONS

Japanese Office Action with English Translation dated Feb. 26, 2007 (Seven (7) pages).
International Search Report.
European Office Action dated Oct. 2, 2007 with English translation (nine (9) pages).

* cited by examiner

*Primary Examiner*—Erick Solis
(74) *Attorney, Agent, or Firm*—Crowell & Moring LLP

(57) ABSTRACT

A method includes the steps of delivering a main combustion air quantity and a main fuel quantity, from which a main mixture is formed, to the combustion chamber; igniting the main mixture formed in an area of a ignition top dead center; and introducing an additional combustion air quantity and an additional fuel quantity into the combustion chamber after the combustion of the main mixture in such a way that a fuel-exhaust gas/air mixture is formed, which mixture is reacted in an area of a gas exchange top dead center of the piston.

10 Claims, 1 Drawing Sheet

SELF-IGNITING INTERNAL COMBUSTION ENGINE

BACKGROUND AND SUMMARY OF THE INVENTION

The invention relates to a method for operating a boosted internal combustion engine, in particular a self-igniting internal combustion engine having direct fuel injection.

In self-igniting internal combustion engines homogeneous, lean fuel-air mixtures are often made to self-ignite, so that a high efficiency and improved exhaust emissions are obtained. A specific quantity of exhaust gas is retained in the combustion chamber in order to influence the mixture temperature at the end of a compression phase of the internal combustion engine. In the lower load and speed range the temperature level in the combustion chamber falls, making it difficult to regulate the mixture temperature on the basis of the smaller fuel mass involved in the reaction. One way of compensating for the energy loss due to falling exhaust gas temperatures is to increase the exhaust gas retention rate.

Despite a high rate of exhaust gas retention, however, below a certain exhaust gas temperature level it is no longer possible to ensure stable combustion. The reason for this is that the retained exhaust gas is basically slow to react, resulting in a combustion lag. This leads to increased exhaust emissions, which reduce the combustion efficiency and also lead to large mean pressure fluctuations of the internal combustion engine.

DE 198 10 935 C2 discloses a method for operating a four-stroke internal combustion engine, in which a homogeneous, lean basic mixture of air, fuel and retained exhaust gas is formed, which is burned by a compression ignition. At the same time an activation phase is interposed in order to extend the engine operating range with compression ignition. During the compression of the retained exhaust gas an activation fuel quantity is injected into the combustion chamber and is distributed as homogeneously as possible with the rest of the fuel fractions in the combustion chamber. Power output and compression impart thermal energy to the fuel, so that a chemical reaction or ignition is initiated at the gas exchange dead center.

The aforementioned method presupposes that a combustion, in which sufficient exhaust gases are produced at a high temperature, occurs in each working cycle. Since the self-ignition of a homogeneous, lean mixture depends very heavily on the engine parameters and the ambient conditions, misfiring can occur, which in extreme cases leads to a complete absence of combustion.

The object of the invention therefore is to create a method for operating an internal combustion engine in which a reliable, self-igniting operation is ensured.

According to the invention this object is achieved by a method that includes the steps of delivering a main combustion air quantity and a main fuel quantity, from which a main mixture is formed, to the combustion chamber; igniting the main mixture formed in an area of a ignition top dead center; and introducing an additional combustion air quantity and an additional fuel quantity into the combustion chamber after the combustion of the main mixture in such a way that a fuel-exhaust gas/air mixture is formed, which mixture is reacted in an area of a gas exchange top dead center of the piston.

A distinctive feature of the method according to the invention is that after combustion of the main mixture an additional combustion air quantity and an additional fuel quantity are introduced into the combustion chamber in such a way that a fuel-exhaust gas/air mixture is formed, which is reacted in an area of a gas exchange top dead center of the piston. An interim mixture is thereby formed for raising the combustion chamber temperature, said mixture being reacted by a compression ignition and/or applied ignition prior to the main combustion taking place, in such a way as to permit regulation of the main mixture temperature.

In a development of the invention the additional fuel quantity is introduced into the combustion chamber in an area between the end of a piston expansion stroke and a final part of a piston exhaust stroke. This ensures that the additional fuel quantity is distributed and vaporized in the combustion chamber well before the gas exchange dead center.

According to a further development of the invention the additional fresh air quantity is delivered to the combustion chamber in an area between a final part of the piston expansion stroke and a final part of the piston exhaust stroke. By introducing the additional fresh air quantity into the combustion chamber, an ignitable mixture is formed, the additional fresh air quantity being delivered in proportion to the additional fuel quantity. The exhaust gas energy raises the temperature of the interim mixture to a specific temperature level, the temperature of the mixture being determined by the proportions of fresh air and exhaust gas.

In a further development of the invention at least one exhaust valve and at least one inlet valve are opened during the introduction of the additional fresh air quantity and/or the additional fuel quantity. The exhaust valve is preferably opened first and then the inlet valve. This opening sequence causes a proportion of the exhaust gas to be expelled from the combustion chamber first, so that the introduction of an additional fresh air quantity is ensured by the pressure that has built up in the intake pipe.

Further features and combinations of features are set forth in the description. Actual exemplary embodiments of the invention are represented in simplified form in the drawings and are explained in more detail in the following description.

DETAILED DESCRIPTION OF THE DRAWINGS

An example of a boosted internal combustion engine with direct fuel injection preferably comprises four cylinders, in which a longitudinally displaceable piston is guided. The internal combustion engine comprises at least one inlet valve, at least one exhaust valve, a fuel injector and an ignition source for each combustion chamber. The combustion chamber of the internal combustion engine is sealed off at the top by a cylinder head, the piston defining the combustion chamber towards the bottom. The internal combustion engine works on the four-stroke principle, although it may alternatively operate on the two-stroke principle.

The internal combustion engine is boosted in that the combustion air supplied is delivered to the combustion chamber at a higher pressure $P_S$ than the ambient pressure $P_U$. The combustion air is delivered to the combustion chamber via the inlet valves of the internal combustion engine and the exhaust gases produced are expelled from the combustion chamber by the exhaust valves of the internal combustion engine. The inlet and exhaust valves are opened and closed by an actuating device. A control unit controls the opening and closing times of the inlet and exhaust valves according to the operating point reached.

Figure 1:
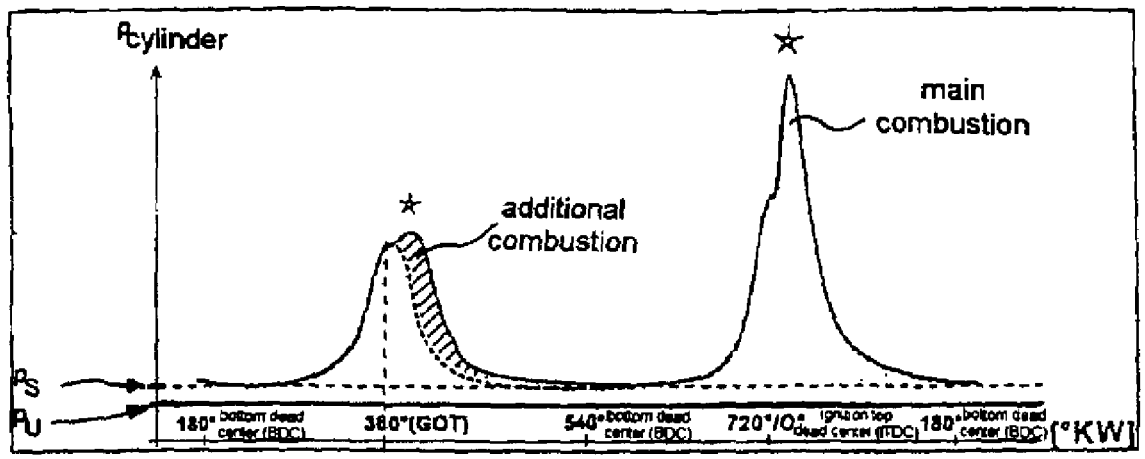
FIG. 1 shows a schematic diagram of a cylinder pressure curve for a boosted internal combustion engine during a working cycle plotted over the crank angle.

In a four-stroke method one stroke corresponds to a full piston stroke. FIG. 1 represents the curve for a combustion chamber pressure during a working cycle of an internal combustion engine according to the invention. The four-stroke working cycle of the internal combustion engine corresponds to one combustion cycle, a combustion cycle commencing with an initial intake stroke, in which the piston in a downwards movement moves to a bottom dead center UT. On the intake strokes combustion air is delivered to the combustion chamber, and a specific quantity of exhaust gas from an exhaust stroke of a previous working cycle according to the invention is retained in the combustion chamber.

During the intake stroke the introduction of fuel into the combustion chamber forms a main mixture, which is compressed in a subsequent compression stroke. During the compression stroke the piston in an upward movement moves from the bottom dead center UT to an ignition top dead center ZOT, and a main fuel quantity in the main mixture preferably is introduced into the combustion chamber during the intake stroke. The main mixture formed is self-ignited by the prevailing compression in an area of the ignition top dead center.

Alternatively the main mixture can be ignited by applied ignition by an ignition source as a function of the load, for example in starting operation or in high load ranges. Whilst combustion of the main mixture is still in progress the piston expands in a downward movement to a bottom dead center UT. In the succeeding exhaust stroke the piston in an upward movement travels to a gas exchange top dead center GOT and expels the exhaust gases from the combustion chamber. According to the invention an exhaust valve is opened during the exhaust stroke, so that the exhaust gases are expelled from the combustion chamber. A specific quantity of exhaust gas is retained in the combustion chamber by a premature closure of the exhaust valve. During the exhaust stroke an additional fuel quantity and an additional combustion air quantity are delivered to the combustion chamber in such a way that an interim mixture of fuel, exhaust gas and air is formed, which is reacted in an area of the gas exchange top dead center GOT.

According to FIG. 1 the reaction of the additional mixture takes place in the area of the gas exchange top dead center GOT, so that the temperature of the combustion chamber is increased by an additional combustion ZV. This leads to an increase in the combustion chamber pressure $P_Z$. The energy conversion in the area of the gas exchange top dead center GOT also raises the temperature of all the exhaust gas retained in the combustion chamber, so that the high heat losses from the exhaust gas to a combustion chamber wall, especially in the lower speed and load ranges, are compensated for. A higher energy and temperature level is therefore available for the subsequent main combustion HV, with the result that an energy loss due to the smaller fuel quantity reacted in meeting lower engine loads is compensated for. This permits a reliable operation of the internal combustion engine with compression ignition even in the lower speed and load ranges. This increases the operating range run with compression ignition, so that a further improvement in exhaust emissions can be achieved when idling, for example.

Figure 2:
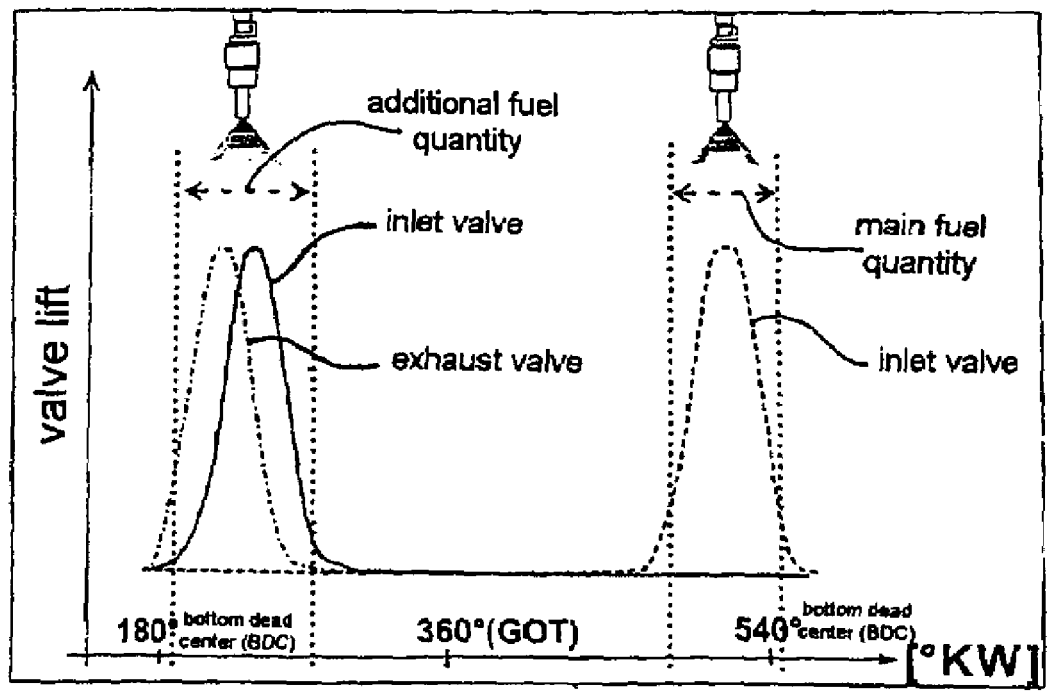
FIG. 2 shows a schematic diagram of a valve lift of the internal combustion engine in FIG. 1 in operation plotted over the crank angle.

According to FIG. 2, during the introduction of the additional combustion air quantity and/or the additional fuel quantity, the exhaust valve is opened first and then the inlet valve. In the process the opening and closing times of the inlet valve $E_Z$ are defined by the additional quantity of fresh or combustion air needed. The return flow of fresh gas or exhaust gas from the combustion chamber into the intake port is prevented by the prevailing boost pressure $P_S$ in the intake port of the internal combustion engine.

The introduction of the additional fuel quantity $m_z$ can be achieved by a direct fuel injection into the combustion chamber, it being likewise possible to introduce fuel in the intake port of the internal combustion engine. The inlet valve $E_z$ is opened when the pressure in the combustion chamber has fallen below the boost pressure $P_S$ in the intake pipe. The additional combustion air then also flows due to a pressure gradient between the intake pipe and the combustion chamber, the fuel at the same time being introduced into the combustion chamber by a direct or port injection. The exhaust valve $A_z$ is then closed again before the injected fuel can flow into the exhaust port via the opened exhaust valve $A_z$. Shortly thereafter the inlet valve $E_z$ is then closed again, so that the piston cannot expel the additional fresh combustion chamber charge into the intake port. A defined residual gas quantity, which determines the temperature level in the combustion chamber, is retained in the combustion chamber over the closing time of the exhaust valve $A_z$. The increase in the combustion chamber temperature is determined by the additional fuel quantity $m_z$ or is influenced by the energy converted during the additional combustion $Z_v$.

The quantity of additional combustion air delivered to the combustion chamber is defined by way of the closing time of the inlet valve $E_z$ and the charging pressure $P_s$. After the formation of the additional mixture the piston, as it runs up to the gas exchange top dead center GOT, begins to compress the additional mixture, so that self-ignition of the additional mixture will occur at the end of compression due to a final compression temperature and due to the temperature of the retained exhaust gas. It is also feasible for the additional mixture to be ignited by applied ignition as a function of the load. In particular, such applied ignition may be advisable in starting operation. The combustion chamber pressure $P_z$ in the combustion chamber increases in such a way that the piston also performs work during the intake stroke. In the subsequent intake stroke the inlet valve $E_H$ is opened and the main combustion air quantity and the main fuel quantity $m_H$ are delivered to the combustion chamber. The main combustion HV then takes place in the area of the ignition top dead center ZOT following the compression of the main mixture.

By means of the method according to the invention the internal combustion engine can be operated with compression ignition at basically all load points and in all load ranges without the occurrence of misfiring. Raising the temperature in the combustion chamber at the gas exchange top dead center GOT ensures that combustion by compression ignition can take place in each combustion cycle.

The method according to the invention can also feasibly be performed with exhaust gas recirculation rather than exhaust gas retention. In this case exhaust gas is returned from the exhaust port into the inlet port by an exhaust gas recirculation valve (not shown), so that the basic mixture can be adjusted to a specific temperature. Alternatively the exhaust gas recirculation may occur internally. In this case the exhaust gas is partially expelled into the inlet port through the opened inlet valve during the exhaust stroke and is then drawn back into the combustion chamber together with the combustion air intake during the intake stroke. In addition the exhaust gas recirculation may occur internally in such a way that the exhaust gas is fully expelled into the exhaust port during the exhaust stroke and is then partially drawn back into the combustion chamber via the opened exhaust valve during the intake stroke. The inlet valve is opened after or during the exhaust valve closing sequence.

It is furthermore feasible, either in addition or as an alternative, for a charge which is ignited by an ignition source to be stratified by the direct injection shortly before the gas exchange top dead center. That is to say a second additional fuel quantity is introduced into the combustion chamber in the area of the gas exchange top dead center in such a way that inside the interim mixture an ignitable mixture cloud is formed in the area of an ignition source. The mixture cloud formed with the second additional fuel quantity is ignited by the ignition source, the lean interim mixture present in the combustion chamber being brought to self-ignite by the combustion of the mixture cloud formed with the second additional fuel quantity. Alternatively the mixture cloud formed with the second additional fuel quantity can be ignited by the ignition source in such a way that the combustion thereby initiated likewise includes the non-self-igniting interim mixture present in the combustion chamber.

It is furthermore feasible to use a fuel injector, by way of which an air quantity and the fuel quantity can be introduced. In this case the air and the fuel are mixed by the injection device and are then injected into the combustion chamber by the fuel injector. The fuel injector may also serve as an ignition source.

The invention claimed is:

1. A method for operating a boosted internal combustion engine having a fuel injection device, a cylinder, a cylinder head, a piston and a combustion chamber defined between the cylinder head and the piston, the method comprising, during each working cycle of the engine, the steps of:
   delivering a main combustion air quantity and a main fuel quantity, from which a main mixture is formed, to the combustion chamber;
   causing the main mixture to self ignite by prevailing pressure in an area of an ignition top dead center; and
   introducing an additional combustion air quantity and an additional fuel quantity into the combustion chamber during an exhaust stroke of said working cycle, after the combustion of the main mixture, whereby a fuel-exhaust gas/air mixture is formed; and
   causing said fuel-exhaust gas/air mixture to react in an area of a gas exchange top dead center of the piston.

2. The method as claimed in claim 1, wherein the additional fresh air quantity is delivered to the combustion chamber in an area between a final part of the expansion stroke and a final part of the exhaust stroke.

3. The method as claimed in claim 1, further comprising opening at least one exhaust valve and at least one inlet valve during the introduction of at least one of the additional fresh air quantity and the additional fuel quantity.

4. The method as claimed in claim 3, further comprising, during the introduction of the additional fuel quantity, opening the exhaust valve first and then the inlet valve.

5. The method as claimed in claim 4, wherein said fuel is injected into an intake pipe of the internal combustion engine or directly into the combustion chamber by the fuel injection device.

6. The method as claimed in claim 5, wherein the internal combustion engine is operated with a compression ratio of between 8 and 16.

7. The method as claimed claim 6, wherein the compression ratio is between 8 and 13.

8. The method as claimed in claim 1, wherein said fuel is injected into an intake pipe of the internal combustion engine or directly into the combustion chamber by the fuel injection device.

9. The method as claimed in claim 1, wherein the internal combustion engine is operated with a compression ratio of between 8 and 16.

10. The method as claimed claim 9, wherein the compression ratio is between 8 and 13.

* * * * *